J. L. PHILLIPS.
POTATO DIGGER.
APPLICATION FILED SEPT. 17, 1915.
1,187,089.
Patented June 13, 1916.
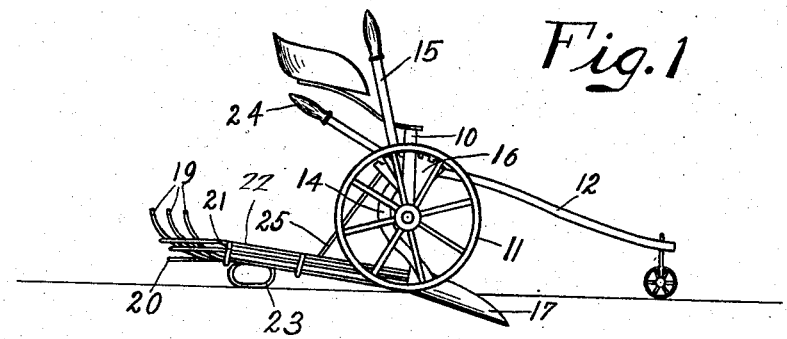
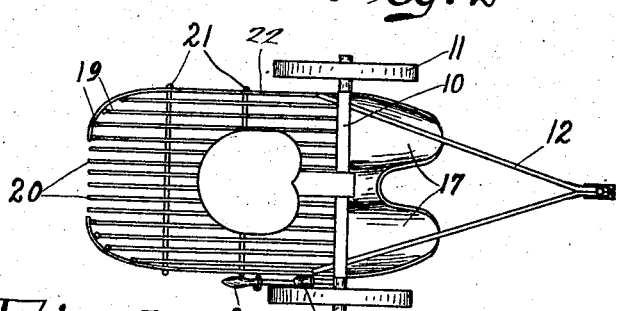
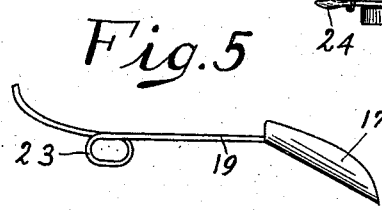
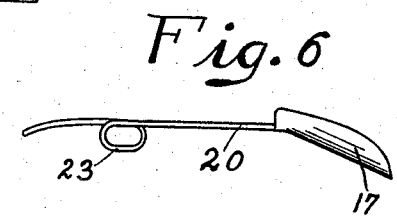
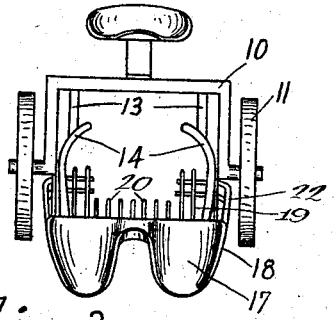
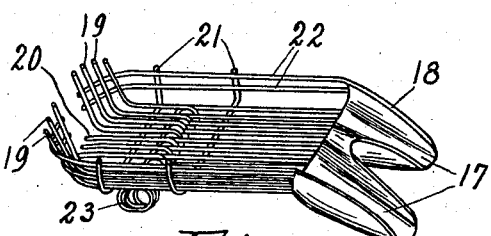
WITNESSES:
INVENTOR.
James L. Phillips
BY
J. Ray Abbey
ATTORNEYS.

UNITED STATES PATENT OFFICE.

JAMES L. PHILLIPS, OF HOPE, MICHIGAN.

POTATO-DIGGER.

1,187,089.

Specification of Letters Patent. Patented June 13, 1916.

Application filed September 17, 1915. Serial No. 51,242.

*To all whom it may concern:*

Be it known that I, JAMES L. PHILLIPS, a citizen of the United States, residing at Hope, in the county of Midland and State of Michigan, have invented certain new and useful Improvements in Potato-Diggers, of which the following is a specification.

This invention is an improved machine for digging and screening potatoes, and similar vegetables, and belongs to that type of machine that is propelled by means of draft animals, or other suitably applied power.

One object of the invention is to provide mechanism for simultaneously digging up a plurality of rows of potatoes.

A further object is to screen the potatoes from the earth plowed up with them.

A further object is to provide means whereby the potatoes are deposited in rows on the surface of the ground, where they can be conveniently removed.

The invention will be hereinafter fully set forth and particularly pointed out in the claims.

In the accompanying drawing:—Figure 1 is a side view of a machine embodying the invention. Fig. 2 is a top plan view thereof. Fig. 3 is a front elevation with the front braces broken away. Fig. 4 is a perspective view of the scoops or plows and their attached screening device. Figs. 5 and 6 are detail views illustrating the bars employed in the construction of the screening device.

Referring to the drawing, a frame of any suitable or preferred type is employed, that illustrated comprising a transverse bar 10 provided with axles for the carrying wheels 11, and a beam or brace 12, to which the team, or other source of power may be attached in suitable manner. The beam 12 is provided at its rear end with diverging arms 13, attached to the bar 10, and depending from said arms are brace arms 14 connected to the plow member.

The plow member may be raised or lowered by means of a lever 15 pivotally supported in the frame, and said lever is held in adjusted position by means of a suitable pawl and quadrant construction illustrated at 16.

In the construction illustrated, the plow member comprises two scoop-like portions 17 projected downwardly at an angle to conveniently enter the ground, the side edges of said scoop-like portions being turned upwardly, as indicated at 18, to prevent lateral movement of the vegetables, and to impel the vegetables to travel in a generally rearward direction. Attached to the rear edge of the plow member, and extending longitudinally in a rearward direction therefrom, is a screen. Said screen comprises a plurality of longitudinally disposed rods 19 having up-turned rear ends, and a series of longitudinally disposed rods 20, arranged at the middle of the screen, and having downturned rear ends. Said rods are connected by cross rods 21, having upstanding ends which are attached to side rods 22, said side rods forming sides for the screens and having their rear ends turned inwardly, transversely of the screen to engage the upwardly extended ends of the rods 19. In order to hold the basket above the surface of the ground, the same is provided with runners, preferably formed by providing the rods 19 and 20 with loop portions 23. In order to completely elevate the screen from the ground, when the machine is not in use, a lever 24 is provided, the same being pivoted to the frame of the machine in suitable manner and connected to the screen by means of a suitable link 25.

In operation, the machine is drawn along by the application of suitable power, and the plow member lowered so that the scoop-like portions 17 will enter the rows containing the vegetables to be raised, and at the same time the screen is lowered to travel on the runners 23. As the machine moves forward the vegetables are taken up by the scoop-like portions 17, and are caused to travel backwardly into the basket or screen. The vibration of the machine in its travel, shakes the loose earth from the vegetables on the screen, and said earth will fall between the rods of which the screen is constructed. The side rods 22, and the upturned rear ends of the rods 19 are so disposed as to gradually cause the vegetables to travel toward the opening provided by the downturned rear ends of the rods 20. The vegetables are discharged through said opening in a row, where they can be readily removed. It will be noted that the rods 19 are of gradually increased length, so as to permit the side-rods to coöperate therewith to form a gradually curved guide extending toward the middle of the rear end of the screen, the rods 19 being arranged in two sets, with the rods 20 between the sets.

Having thus explained the nature of my invention and described an operative manner of constructing and using the same, although without attempting to set forth all of the forms in which it may be made, or all of the forms of its use, what I claim is:—

1. A vegetable digger comprising a supporting frame, a plow member attached to said frame and provided at its rear end with a screen, said screen having upstanding side and rear portions, said rear portions being provided with a middle opening to permit discharge of vegetables moving over said screen.

2. A vegetable digger comprising a supporting frame, a plow member attached to said frame, a plurality of sets of bars extending rearwardly from said plow member and provided with upturned ends, bars interposed between said sets of bars provided with downturned ends, and means for preventing the vegetables from leaving said screen except at the rear end thereof.

3. A vegetable digger comprising a supporting frame, a plow member attached to said frame, a plurality of sets of bars extending rearwardly from said plow member, and provided with upturned ends, bars interposed between said sets of bars and provided with downturned ends, and side bars having their rear ends attached to the upstanding ends of the first mentioned bars.

4. A vegetable digger comprising a supporting frame, a plow member attached to said frame, a plurality of sets of bars extending rearwardly from said plow member, and provided with upturned ends, bars interposed between said sets of bars and provided with downturned ends, and runners formed by loop portions of said rods.

5. A vegetable digger comprising a supporting frame, a plow member attached to said frame and provided with a plurality of scoop portions, and a screen for receiving vegetables from said plow member, said screen being formed with a plurality of sets of bars extending rearwardly from the plow member and provided with upturned rear ends, and bars interposed between said sets of bars and provided with downturned rear ends.

In testimony whereof I have affixed my signature in presence of two witnesses.

JAMES L. PHILLIPS.

Witnesses:
WILLIAM E. CRANE,
LLOYD T. CRANE.

Copies of this patent may be obtained for five cents each, by addressing the "Commissioner of Patents, Washington, D. C."